Patented Feb. 27, 1934

1,948,884

UNITED STATES PATENT OFFICE

1,948,884

PROCESS OF TREATING AN IRISH POTATO TO REMOVE THE CORKY LAYER AND THE PRODUCT THEREOF

Samuel Allan Patterson, Seattle, Wash., assignor to Albert Peter Grommesch, Seattle, Wash.

No Drawing. Application August 8, 1931
Serial No. 556,033

3 Claims. (Cl. 99—11)

My invention relates to a process of treating an Irish potato, (*Solanum tuberosum*) to remove the outer or corky layer and to the product thereof. More particularly, my invention relates to the process of treating an Irish potato, (a) to remove the outer or corky layer while preserving the natural appearance or configuration, that is, without disturbing the natural eyepit and fissure markings, and (b) to change the cortex layer into a protective layer whereby evaporation of moisture from the body or starchy portion of the potato is inhibited so that a product which is in the raw material state results, which product upon being further treated to prevent discoloration, may be stored for a relatively long period of time before using, and yet, said protective coating upon cooking the product, becomes an unrecognizable integral part of the potato proper.

Heretofore, it has been the custom to prepare raw or uncooked potatoes for consumption by peeling them manually with a knife or other sharp instrument, or mechanically, or by a lye treatment in order to remove the skin just prior to use. Some of the disadvantages of these processes are:

The difficulty of so controlling the knife as to remove only the skin of the potato without cutting away a considerable portion of edible matter, more especially the highly nutritious proteinous layer which lies just underneath the skin known as the cortex layer; the large amount of manual labor involved and the time consumed in removing the skin which forms a natural tough protective coating for the potato; the excessive waste when mechanical devices of design in common use are employed and the necessity of removing the skin just prior to use since the freshly peeled potato is subject to oxidative influences, loss of moisture and the like, which, within a few hours make themselves manifest by producing discoloration, shrivelling, mold formation or by otherwise affecting the appearance, taste or edibility. The time element and manual labor become obviously very important in large hotels and in all places where large quantities of food must be served at a given time. The waste amounts to as much as thirty per cent and published authorities say twenty per cent or more. The big objection to the lye process is that it discolors and produces a slimy coat.

A primary object of my invention is to provide an Irish potato product, the skin of which has been so treated as to render it easily removed and at the same time a protective coating is formed out of the outer portion of the cortex layer.

A further primary object of my invention is to provide a potato having substantially the characteristics in appearance and character of an unpeeled potato, as respects eyepits and fissures, but with the skin removed and with a protective coating formed from the outer portion of the cortex layer which is characterized by having a greatly lowered tendency to lose moisture, to be affected by discoloration, mold formation and the like, compared to the case of an ordinary peeled potato. Evaporation, in the case of an article of the character in question is a serious problem and must be prevented to eliminate loss of weight and shrivelling.

Another primary object of my invention is to provide a product having the characteristics above set forth and characterized particularly, by its cheapness of production on a small or large scale. Also, it is the object of my invention to provide a product which in all respects resembles the natural potato only freed of its outer or corky layer, but with a changed cortex layer so that the same may be further treated whereby there results a product which may be stored for a relatively long period of time, that is, for the order of weeks, and then used as a raw potato, the cortex layer becoming the unrecognizable integral part of the potato proper upon cooking.

I have discovered that the tough skin or outer coating of the potato, that is, the corky layer, is loosened when the potato is subjected to a sudden blast of heat of an intensity sufficient to cause free moisture or vapor to collect beneath the skin so that the skin may be thereafter readily removed mechanically by friction, or by impinging water or air pressure. The loosening of said skin should be attended with the formation of a protective coating of the outer portion of the cortex layer and this without substantial alteration of the body or starchy portion of the potato proper, so that said latter portion remains in its raw natural state. This is necessary to prevent the potato from acquiring the usual sour taste which results in a cooked potato when allowed to stand for some period of time. I have discovered that although the Irish potato is primarily of a starchy content and therefore peculiarly responsive to the action of heat, nevertheless, heat may be employed as herein set forth to remove the corky layer. It will be remembered that starch grains of wheat do not react to heat by disrupting the envelope, yet potato starch grains are peculiarly susceptible to such disrupting and therefore the fact that heat may be employed as herein set forth is the more remarkable.

In carrying out my invention, I introduce the potatoes after harvesting preferably, but not necessarily, after washing into a heated current of air or gas. Washing removes mud and insures a uniform exposure to the heat. The temperature may be as low as 500° or as high as 3200° Fahrenheit, or higher. However, I find that a good working temperature where good practical results are obtained is when the temperature is kept between 1500° and 2000° Fahrenheit.

Any suitable means may be used for creating such condition of the air or gas. Burning gas as in a flame directly applied to the potato is preferable and manifestly, using the burning gases is the most economical form of applying the heat. In any event, the exposure of the potato in such heated air or gas in the act of combustion must only be momentary. My aim is to shock the potatoes with an instantaneous heat of high temperature which will in a very short time, that is, in a few seconds of time, about 15 seconds, or in the range of seven to twenty-five seconds, depending upon the particular batch of potatoes. The tests herein related are from experiments on Netted Gems. My experience is that different varieties of Irish potatoes require different periods of exposure to the heat. Also, potatoes from different localities or fields differ as well as during different seasons of the year. The process works best on potatoes before they start sprouting. However, the proper time for a specific or given batch of potatoes is readily determined by actually testing a few potatoes.

By having the shock of heat sufficiently severe, as outlined, I suddenly cause free moisture to be collected beneath the skin of the potato which loosens it. This free moisture may even be formed into steam and by causing the collection of this free moisture the outer portion of the cortex layer is partly dehydrated and the said portion is also partially coagulated, at least as respects the proteinous content, which thereby forms a new protective coating for the unaltered starchy portion positioned below the cortex layer in the body of the potato. Immediately upon withdrawing the potato from the heat, I preferably subject the same to cooling, treating cold air or water to insure stopping all tendency for the heat to continue its effect and thereby cook the potato to an undesirable depth, i. e., to a depth that will result in the potato becoming moldy or souring when stored for a period of the order of days or weeks before using. The sudden cooling after heating seems to aid in the removal of the corky layer and is preferably done simultaneously during the treatment comprising separating and complete removal of the corky layer from the potato by rubbing or water spraying or other mechanical action. If stopping the cooking is not thus done simultaneously with the withdrawal of the corky layer, then the cold water tends to set the agglutinant substances beneath the skin and makes subsequent removal more difficult. A feature of my discovery is that heating and the desired results from heating as herein set forth may be done without cooking the potato to an extent that will result in objectionable souring. The body of the potato is thus maintained in its raw natural condition. Having loosened the corky layer as above outlined, the same may be readily removed mechanically by friction means, or by sheets of water, so that the natural topography, as it were, of the potato is fully preserved, that is, the natural appearance having the eyepits and the regular fissures remaining so that the product has the appearance both in form and in color of the natural raw potato, only having the corky layer removed. This protective coating is of a character which greatly inhibits evaporation and when further treated to prevent discoloration and provide for preserving the potato according to the process of fumigating which may be that constituting the invention of Charles D. Draper for which a co-pending application, Serial Number 562,606 has been filed, becomes a coating which will protect the potato and preserve it for a relatively long period of time, that is, of the order of weeks, so that it may be stored in a dry cool place and kept for such period before using after having the corky layer removed. It is highly important and necessary that the cortex layer be formed of a character which will permit such further treatment to prevent discoloration and provide for aiding preservation. It will be understood that the cortex layer is the layer which contains the coloring substance. The coloring matter including the green color that develops on exposure to light resides in the cortex layer.

While I find it is possible by heat to cause the free moisture or vapor to collect beneath the corky layer to effectively remove the same, and at the same time form said protective coating, yet, I find it possible to so heat the potato without cooking the same to a depth which will result in causing souring to occur. Also, I find such protective coating thus formed is of a character which may be further treated to prevent discoloration by chemical reagents, such as fumes of burning sulphur. This treatment however, as stated above, is the sole invention set forth in said co-pending application of Charles D. Draper.

Heating the potato to give it the protective coating also seems to destroy fungus growth and surface insect life when present.

By this treating, in accordance with my discovery as above set forth, it is possible to treat potatoes in large quantities economically and to provide for the removal of the corky layer, then changing the outer portion of the cortex layer to provide an extremely thin protective layer which layer may be about 1/64 to 1/16 of an inch in thickness, and which, despite its thinness is yet of a character which will prevent evaporation by reason of its dehydrated and coagulated condition and which particularly will prevent evaporation when treated to prevent discoloration and thus forms a potato product resembling with utmost fidelity the appearance of the natural potato, but with the corky layer removed and in a raw state which is capable of being kept and stored for a relatively long period of time before using.

I claim:

1. The process of treating an Irish potato (*Solanum tuberosum*) to remove the outer or corky layer while preserving the natural appearance or configuration with fidelity with respect to the natural eyepit and fissure markings, comprising subjecting said potato uniformly over its entire surface to a sudden shock of heat of a relatively high temperature for a period of time sufficient to cause moisture to be collected immediately beneath the said corky layer, and to loosen said corky layer thereby, and only to dehydrate and only to coagulate that portion of the cortex layer next to the corky layer to form a relatively thin protective coating, and immediately after exposure to said shock of heat cooling said potato, whereby evaporation subsequently of moisture in the potato is inhibited, so that a product results which is in the raw natural state beneath the said protective coating, and which raw product may be stored under normal and customary conditions without deterioration for a relatively long time before cooking.

2. The process of treating an Irish potato (*Solanum tuberosum*) to remove the outer or corky layer while preserving the natural appearance or configuration with fidelity with respect to the natural eyepit and fissure markings, comprising subjecting said potato uniformly over its entire surface to a sudden shock of heat of a 500° F. or greater temperature for a period of time sufficient to cause moisture to be collected immediately beneath the said corky layer, and to loosen said corky layer thereby, and only to dehydrate and only to coagulate that portion of the cortex layer next to the corky layer to form a relatively thin protective coating, whereby evaporation subsequently of moisture in the potato is inhibited, so that a product results which is in the raw natural state beneath the said protective coating; immediately after exposure to said shock of heat, cooling said potato; and eliminating, substantially simultaneously with the cooling, said loosened corky layer, said raw product being capable of being stored under normal and customary conditions without deterioration for a relatively long time before cooking.

3. As an article of manufacture, a raw Irish potato (*Solanum tuberosum*) having the corky layer removed and having that portion of the cortex layer next to the corky layer dehydrated and coagulated, said dehydration and coagulation being confined to said cortex layer to form a relatively thin protective coating, whereby subsequent evaporation of moisture is substantially inhibited in said raw product, said product being characterized by being capable of storage under normal and customary conditions without deterioration for a relatively long time before cooking, and said product being further characterized by resembling the original potato with fidelity as to appearance as respects eyepit and fissure markings.

SAMUEL ALLAN PATTERSON.